D. R. PRINDLE.

Improvement in Portable Furnace, Boiler, and Steamer,

No. 5,095. Reissued Oct. 8, 1872.

Witnesses.

A. Poole.
John R. Young

Inventor.

D. R. Prindle, by
Prindle & Co., his
attys

AM. PHOTO-LITHOGRAPHIC CO. N.Y. (OSBORNE'S PROCESS.)

UNITED STATES PATENT OFFICE.

DANIEL R. PRINDLE, OF EAST BETHANY, NEW YORK.

IMPROVEMENT IN PORTABLE FURNACES, BOILERS, AND STEAMERS.

Specification forming part of Letters Patent No. 25,442, dated September 13, 1859; reissue No. 864, dated December 13, 1859; reissue No. 5,095, dated October 8, 1872.

*To all whom it may concern:*

Be it known that I, DANIEL R. PRINDLE, of East Bethany, in the county of Genesee and State of New York, did invent certain new and useful Improvements in Combined Boilers and Steam-Generators, for which Letters Patent No. 25,442 were issued to me upon the 13th day of September, 1859, and thereafter duly surrendered and reissued upon the 13th day of December, 1859, No. 864; which Letters Patent have been found defective, in that the specification and claims do not cover and embrace all of the original invention and improvements as contained in the model and drawing filed in the United States Patent Office upon the 12th day of February, 1859. Now, therefore, being desirous to reissue the said Letters Patent in the manner and form prescribed by law, I have prepared and do hereby declare that the following is a full, clear, and exact description of the said improvements, reference being had to the accompanying drawing making a part of this specification, in which—

Figure 1:
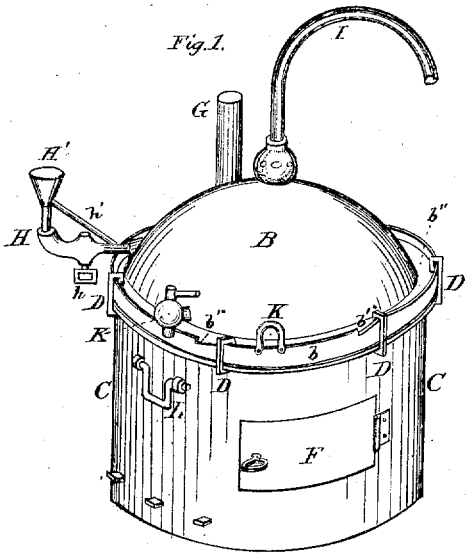
Figure 2:
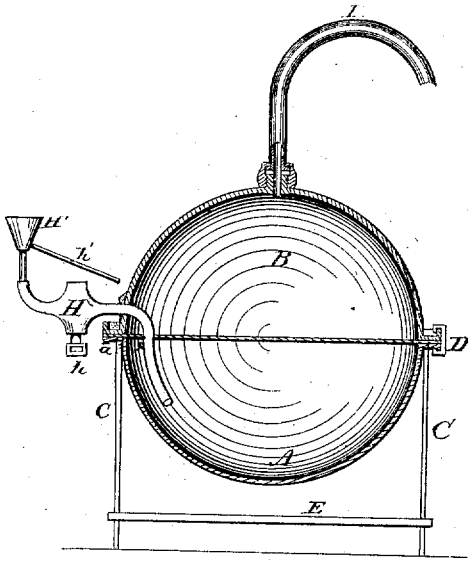
Figure 3:
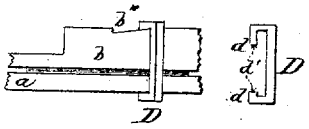
Figure 4:
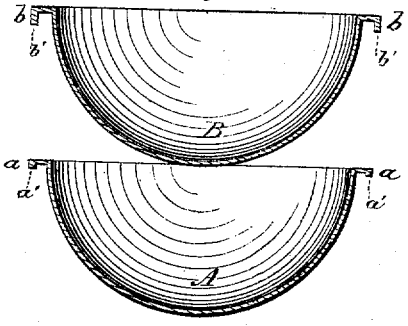

Figure 1 is a perspective view of my device as arranged for use as a steam-generator; Fig. 2 is a vertical central section of the same; Fig. 3 is an enlarged side elevation of a section of the horizontal bearing-flanges of the upper and lower portions of said device as combined; and Fig. 4 is a vertical central section of the section of the boiler when separated.

Letters of like name and kind refer to like parts in each of the figures.

The object of my invention is to produce a device which shall be capable of use in the preparation of cooked food, the heating of water, or the generation of steam, and in addition thereto, shall be practical, efficient, and durable, easily removed from or adjusted to position, and in its construction and operation so simple as to enable farmers of ordinary experience and capacity, and with means and tools commonly at hand, to manage the device with facility; to which end said invention consists, principally, in an apparatus capable of use either as an open caldron, or as a boiler for generating steam, substantially as and for the purpose hereinafter specified. It consists, further, in an apparatus composed of two metallic vessels, which, when combined, shall form a boiler for the generation of steam, and when separated shall be capable of use as caldrons, substantially as and for the purpose hereinafter set forth. It consists, further, in the means employed for securing together the sections of the device, substantially as and for the purpose hereinafter set forth. It consists, finally, in combining, with the device above named, a supporting and inclosing housing or fire-box, substantially as and for the purpose hereinafter shown and described.

In the annexed drawing, A and B represent two metallic vessels, having, preferably, a semi-spherical shape, and provided at their edges with horizontally outward-projecting flanges *a* and *b*, respectively. From the outer edge of the flange *a* a flange, *a'*, extends vertically downward for a short distance, while to the corresponding flange *b* of the upper section a similar flange, *b'*, is secured, and its edge provided with a series of inclined planes, *b''*, which extend entirely around said section and incline in the same direction circumferentially. As thus constructed, the vessels are combined so as to form a steam-generator by placing their concave sides together with suitable packing between their edges, and passing over their flanges a number of clamps, D, which are provided at each end with a horizontal arm, *d*, from the end of which extends, vertically inward, a short arm or lip, *d'*, as seen in Fig. 3, the space between said arms *d* being somewhat less than the distance from the lower edge of the flange *a'* to the upper edge of the highest portion of the flange *b'*, so that when said clamps are passed over said flanges at the lowest portions of the inclines, and then driven upward over the same, said incline shall operate in the same manner as would a wedge, and, by drawing upward upon said clamps, force said sections firmly together. The lower section A rests upon and is supported by means of a cylindrical casing, C, which has an internal diameter equal to the horizontal dimensions of the exterior of said section, and permits the latter to be placed within its upper end, with the flange *a* resting upon the same. Within the casing C, near its lower end, is placed a suitable grate, E, for supporting fuel, which is supplied by means of a door, F, provided at one side of said casing immediately above said grate, while upon the opposite side of said casing is provided a pipe or flue, G, through which the heated escaping products of combustion may pass upward and outward. Water is supplied to the interior of the boiler by means of a pipe, H, which passes inward through the side thereof, and is provided with a suitable stop-cock, *h*, while the steam generated is permitted to escape through a pipe, I, that extends upward and outward from the top of the upper section B. A try-cock, K, placed within the upper section B, immediately above its flange *b*, enables the falling of the water below such point to be instantly determined. In order that the temperature of the flanges may be kept sufficiently low so as to prevent injury to the packing inserted between them, the trough formed by the flanges *b* and *b'* is supplied with water which must entirely evaporate before the temperature of the metal can reach an injurious height. A convenient means for supplying the waste of water within the flange-trough, is by a funnel, H', placed upon or connected with the supply-pipe H, and provided with a drip-pipe, *h'*, through which water may be caused to pass in such quantity as to cause said trough to be kept substantially full whenever the device is in use. As thus arranged the device furnishes a convenient and efficient means for generating steam for all purposes required by farmers, from the running of an engine to the steaming of food, and as its parts are easily separated the operation of taking apart and setting up the device at different points is entirely within the capacity of one person, while in case of boilers ordinarily used, the great weight renders their removal an operation requiring more assistance than is at all times available. For use in cooking food by boiling, or for heating water for general use, the upper section B is removed, so as to constitute the lower section A an ordinary caldron. By removing the pipes from and plugging the holes of the upper section, inverting the same, and supporting it in a suitable position for the action of fire, a second caldron is formed, which is in all respects as efficient as those ordinarily employed. For closing the pipe-holes wood may be employed, its position protecting it from the action of the fire. The addition of suitable handles L upon the sides of the casing C, and for the purpose of conveniently handling the same, completes the device, the advantages of which are as follows:

First, it furnishes in a convenient form, and at a comparatively small expense, a steam generator capable of supplying the wants of farmers who employ steam for cooking food, driving machinery, &c. Second, while capable of being constructed of any desired capacity, the parts of the device are so readily combined or separated as to render it easily portable, while in its operation no tools are required other than those possessed by any farmer. Third, by using both sections for caldrons the device is capable of greater and more general use than any heretofore constructed, and supplies the place of two or more, heretofore, distinct utensils.

Having thus fully set forth the nature and merits of my invention, what I claim as new, is—

1. An apparatus in which one of its parts is capable of use either as an open caldron, or as part of a boiler for generating steam, substantially as and for the purpose specified.

2. An apparatus composed of two metallic vessels which, when combined, shall form a boiler for the generation of steam, and when separated shall be capable of use as caldrons, substantially as and for the purpose shown.

3. The means employed for securing together the flanges of the sections, consisting of the clamps D, *d*, and *d'*, embracing the same and bearing upon the inclines of the flanges *b'*, substantially as set forth.

4. In combination with the steam-generator A and B, the supporting-casing and fire-box C, substantially as and for the purpose shown and described.

In testimony that I claim the foregoing I have hereunto set my hand this 3d day of January, 1872.

DANIEL R. PRINDLE.

Witnesses:

A. COWDIN,

NATHAN A. WOODWARD.